United States Patent [19]

Bender

[11] Patent Number: 4,913,679
[45] Date of Patent: Apr. 3, 1990

[54] DEVICE FOR COMBINE HARVESTERS EQUIPPED WITH A ROTARY STRAW CHOPPER

[76] Inventor: Arne Bender, Larv, S-535 00 Kvänum, Sweden

[21] Appl. No.: 298,882
[22] PCT Filed: Jul. 10, 1987
[86] PCT No.: PCT/SE87/00332
 § 371 Date: Jan. 31, 1989
 § 102(e) Date: Jan. 31, 1989
[87] PCT Pub. No.: WO88/00432
 PCT Pub. Date: Jan. 28, 1988

[30] Foreign Application Priority Data
Jul. 11, 1986 [SE] Sweden ................... 8603089

[51] Int. Cl.⁴ .............. A01D 41/12; A01F 12/40
[52] U.S. Cl. .................... 460/112; 460/99; 460/100; 460/114; 414/505
[58] Field of Search .............. 130/27 E, 27 R; 56/13.7, 13.8, 13.9, 16.4; 241/186 R, 186.1, 186.4, 222–225; 414/505; 460/98, 99, 100, 111, 112, 902, 905

[56] References Cited

U.S. PATENT DOCUMENTS 3,450,286  6/1969  Tessman ................. 414/505
3,669,123  6/1972  Gaeddert et al. .......... 130/27 R
4,637,406  1/1987  Guinn et al. ............. 130/27 R

FOREIGN PATENT DOCUMENTS 872230  5/1987  Norway .
72354   8/1928  Sweden .
5201    of 1884 United Kingdom .
4220    of 1893 United Kingdom .

*Primary Examiner*—Stephen J. Novosad
*Attorney, Agent, or Firm*—Ostrolenk, Faber, Gerb & Soffen

[57] ABSTRACT

A device for combine harvesters (11) equipped with impact straw cutters (16) of the kind equipped with a cleaning device (13) for separation of chaff from the grain and which rotary chopper is connected to the straw outlet (17) of the combine harvester, whereby the chaff coming from the cleaning device (13) and being transported by a flow of air is intended to be supplied to the rotary chopper (16). The rotary chopper is connected to the straw outlet (17) of the combine harvester. The purpose of the invention is to provide a device by which the chaff is spread over the entire harvesting breadth of the combine harvester and is also efficiently admixed with the comminuted straw such that a continuous and even distribution can be obtained on the field. This has been solved by designing the rotary chopper (16) as a lateral flow blower which is arranged to create a negative pressure at the inlet (21) of the rotary chopper, and the outlet of the cleaning device (13) is directed obliquely upwards towards the fall-out area of the straw above the inlet (21) of the rotary chopper such that the chaff is mixed with the straw prior to their reaching the rotary chopper and that the flow of air transporting the chaff to the inlet of the rotary chopper is so dimensioned as to have a pressure within the fall-out area of the straw which slightly exceeds the atmospheric pressure.

9 Claims, 3 Drawing Sheets

DEVICE FOR COMBINE HARVESTERS EQUIPPED WITH A ROTARY STRAW CHOPPER

The present invention refers to a device for combine harvesters equipped with rotary straw chopper, of the type equipped with a cleaning device for separated the chaff from the grains. The rotary chopper is connected to the straw outlet of the combine harvester, whereby the chaff coming from the cleaning device and transported by a flow of air is intended to be supplied to the rotary chopper.

BACKGROUND OF THE INVENTION

Combine harvesters generally have a pickup reel with a cutting table, which can be twice as wide as the width of the harvester. This means that during harvest of straw fodder plants, the chaff after the treshing will be deposited on the field in a rather narrow string, which mainly corresponds to the width of the cleaning device. It nowadays is usual that the straw after treshing is cut and spread over an area mainly corresponding to the width of the cutting table, in order to allow it to be plowed into the soil. The field therefore will have row-formed areas, where the content of disintegrated straw and chaff is bigger than in adjacent areas, which almost entirely lack an admixture of chaff. This uneven distribution results in different growth conditions due to the fact that the growth is hampered in the areas where the soil contains too much disintegrated, but non-mouldered straw and chaff.

There are known treshing machines for treshing cut straw fodder plants, where the chaff from the cleaning device is supplied to a rotary chopper or a straw shredder. The purpose of this mixing of straw and chaff is to improve the nutritional value, in the case where straw is used as fodder. For this reason the rotary chopper outlet is usually equipped with a pressing device, which crushes the straw and the ears.

It was proven that the known technique is impossible to use, as the modern rotary chopper creates a positive pressure about the rotor, which pressure is so big so that the chaff is blown away, causing a blocking of the straw inlet. It also has been tried to feed the chaff tangentially in through a separate opening in the rotary chopper or the straw shredder, but the same problem also occurs in this case, i.e. the positive pressure from the rotor prevents the chaff from entering the rotary chopper. According to another suggestion (British patent No. 4220 from 1893) the chaff is transported by means of a particular blower via a conduit system to a position above the inlet of the rotary chopper. In order to transport the quantities of chaff concerned a rather big positive pressure in the blower is required, which means that an air cushion is created above the rotary chopper, which may cause the straw feed to be blocked.

THE PURPOSE AND MOST IMPORTANT FEATURES OF THE INVENTION

The purpose of the invention is to provide a device by which the chaff is spread over the full harvesting breadth of the combine harvester and is also efficiently admixed with the disintegrated straw, so that a continuous and even distribution of material on the field can be obtained. The device thereby must be such that it does not affect transportation of the non-chopped straw to the rotary straw chopper or adversely affect the separation of the grain from the chaff. It furthermore should be possible, if the rotary chopper is disengaged, e.g. if the straw shall be laid in rows, to deposit the chaff as earlier in a narrow row or alternatively to spread it over the full harvesting width of the combine harvester, without the straw thereby being disintegrated.

These tasks have been attained in that the rotary chopper is also designed as a lateral flow blower, which is arranged to create, at the inlet of the rotary chopper, a negative pressure. Also, the outlet of the cleaning device is directed obliquely upwards towards the fall-out area of the straw above the inlet of the rotary chopper. Thus, the chaff is mixed with the straw prior to reaching the rotary chopper and the flow of air transporting the chaff to the inlet of the rotary chopper is so dimensioned as to have a pressure within the fall-out area of the straw which slightly exceeds atmospheric pressure.

DESCRIPTION OF THE DRAWINGS

The invention hereinafter will be further described with reference to some embodiments.

DESCRIPTION OF EMBODIMENTS

Figure 1:
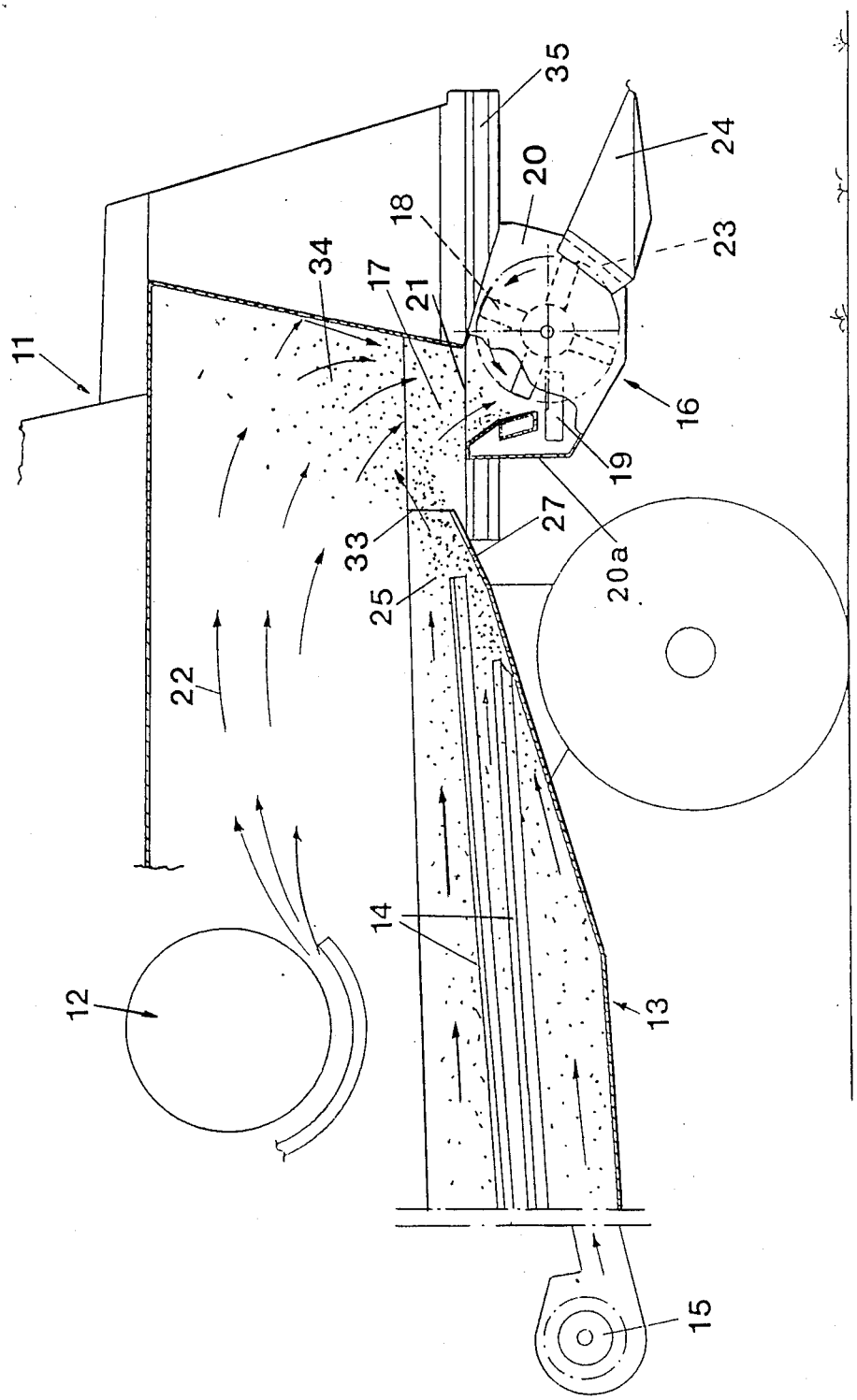
FIG. 1 shows schematically the rearmost part of a combine harvester, partially in section, at the straw outlet of which is arranged a rotary chopper.

In the drawings 11 designates the rearmost part of a combine harvester, 12 is a rotational separator which forms part of the treshing machine of the combine harvester. 13 is a cleaning device, which consists of a plurality of sieves 14 and a cleaning blower 15. A rotary chopper 16 is connected to the straw outlet 17 of a combine harvester. The straw chopper 16 is designed also to act as a transverse flow blower and is in due course equipped with a knife rotor 18, which cooperates with stationary counter knives 19, which are adjustable in different inclinations in order to be adaptable to different types of goods to be cut. The apparatus housing 20 of the rotary chopper is designed with only two openings, one inlet opening 21 for the non-cut straw 22 and one outlet opening 23 to which is also connected a spreading device 24.

In conventional combine harvesters the chaff 25 is let out on the field through an opening directly after the sieves 14, which outlet opening is situated in front of the rotary chopper 16, and without communicating therewith. The chaff 25 is separated from the more heavy grains at the passage through the sieves 14, whereby the more light material is blown away in a direction towards the outlet opening 33 of the cleaning device 13 by means of the air flow caused by the cleaning blower 15. Instead of discharging the chaff in front of the rotary chopper, the combine harvester according to the invention is so designed, that a transport device 26, e.g. in the form of a duct 27 establishes a passage between the outlet 33 of the cleaning mechanism 13 and the inlet 21 of the rotary chopper 16, such as shown in FIG. 1. The duct 27 therefore does not require a closed cross section but can be more or less open. As is evident from FIG. 1, there is a housing on the chopper 16 which includes a wall portion 20a which has a component which faces the duct 27 and which is sufficiently high that the inlet 21 into the chopper 16 is defined above the chopper 16, i.e., above the radius of action (outer periphery of chopper blades) thereof. The wall portion 20a extends from the inlet 21 to the outlet 33. Quite obviously, the chaff 25 and the straw 22, therefore, enter the inlet 21 together.

Figure 2:
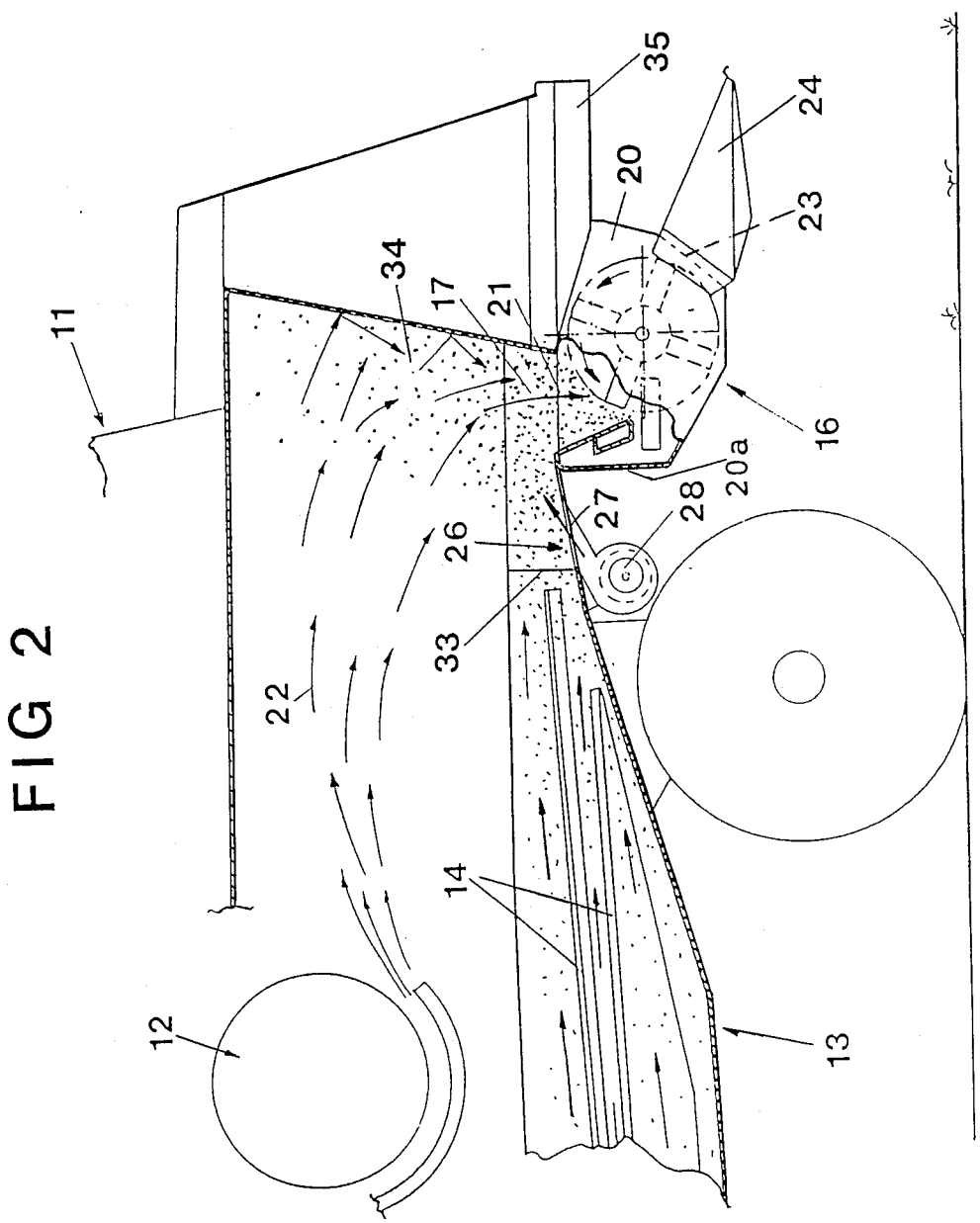
FIG. 2 is a view corresponding to FIG. 1, in which the transport device according to the invention is constituted by an auxiliary blower.

If the conventional cleaning blower 15 of the combine harvester should have a too small of an effect for transporting the chaff to the inlet 21 of the rotary chopper or if the air pressure from the treshing machine 12 should be so big that air is pressed "backwards" into the cleaning device, which could prevent the chaff from reaching the rotary chopper, it is suitable to provide an auxiliary blower 28, which is located such that the air flow caused by the blower creates a counter-pressure to the air pressure from the treshing machine, which air pressures are balanced so that the flows of material from the treshing machine and the cleaning apparatus will not obstruct each other. Such an embodiment is shown in FIG. 2, where the auxiliary blower 28 opens in the bottom of the casing 29 of the cleaning device 13. The connecting sleeve coupling 30 of the auxiliary blower 28 is directed towards the passage 27, and thereby supports the flow of air created by the cleaning blower 15.

Figure 3:
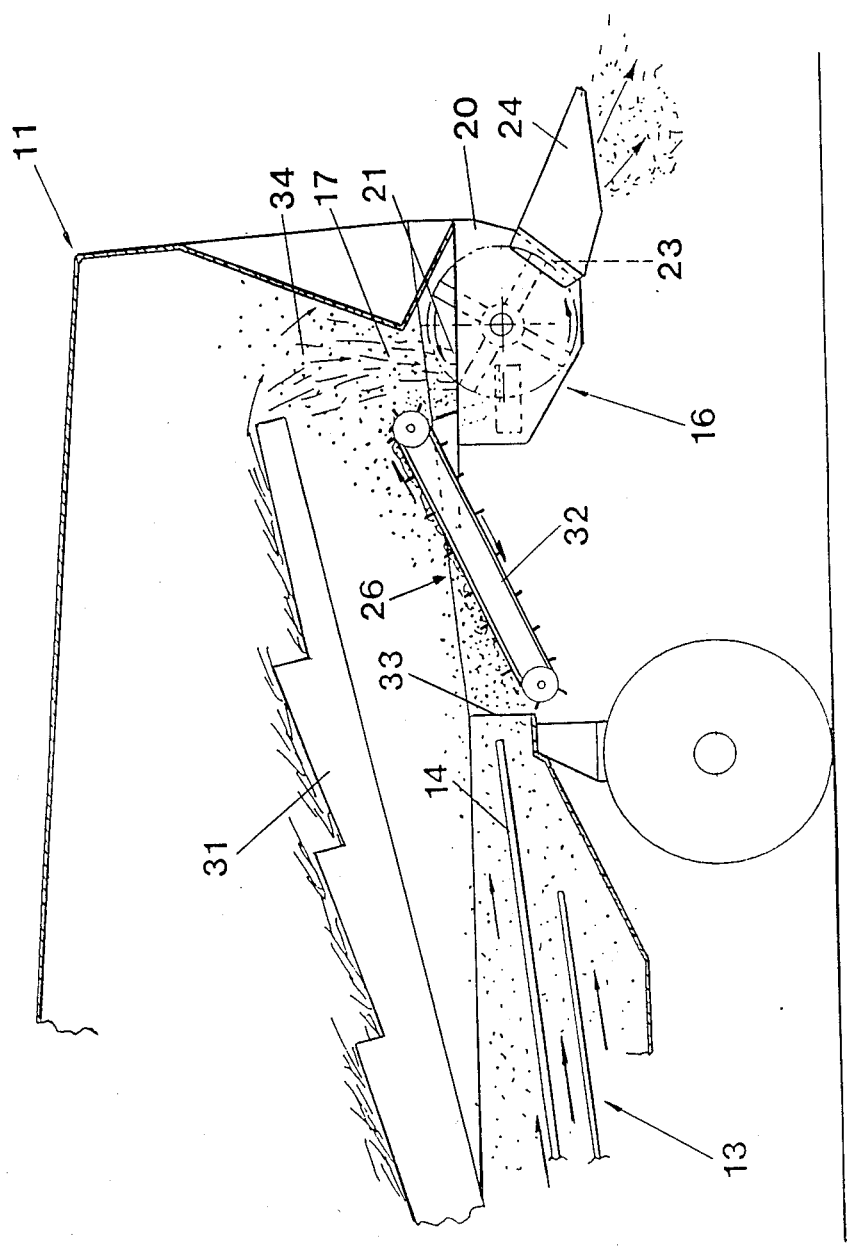
FIG. 3 shows likewise the rearmost portion of a combine harvester of another device type which is equipped with the transport device according to the invention and has the form of a belt conveyor.

In some combine harvesters the treshed straw is transported from the treshing machine via vibrating table 31 to the straw outlet 17 of the combine harvester and if disintegration of the straw is desired then this it is transported to the rotary chopper 16. In these combine harvesters, shown in FIG. 3, the space between the cleaning device and the rotary chopper 16 may be so big that the flow of air from the cleaning blower 15 is insufficient for transporting the chaff to the inlet opening 21 of the rotary chopper. For such combine harvesters the transport device 26 is preferably designed as a belt conveyor 32 or the like, which extends from the outlet opening 33 of the cleaning device 13 to a position above the inlet opening 21 of the rotary chopper 16. The width of the endless belt conveyor 32 corresponds to the width of the outlet opening 33 of the cleaning device 13. In order not to disturb the flow of material on the belt conveyor 32 there is arranged a partition 34 between the vibrating table 31 and the upper part of the belt conveyor 32.

The straw outlet 17 of the combine harvester is conventionally equipped with horizontal guides 35, along which the rotary chopper may be displaced or be swung away if the straw shall be deposited in rows. It however also is possible to open a shutter (not shown) above the rotary chopper and to let out the non-cut straw this way, whereas the cutter is used for spreading the chaff over the full working area of the combine harvester.

The invention is described in a number of embodiments and it is applied in different modified connections. It is, of course, fully within the scope of the invention to combine structural details from one embodiment with corresponding details from another embodiment, but also a combination of details from different varieties are possible. The belt conveyor thus can be used in the combine harvester shown in FIGS. 1 and 2 and the passage and the auxiliary blower at the embodiment according to FIG. 3.

The invention is neither limited to the embodiments shown but a plurality of variants are possible within the scope of the claims.

I claim:

1. A device for a combine harvester, for mixing straw and chaff and for spreading the same behind the combine harvester, the device comprising:
    a cleaning device for separating chaff from grain and a chaff discharging means associated with said cleaning device for discharging chaff;
    a rotary straw chopper having an axis of rotation which extends transversely to a longitudinal dimension associated with said combine harvester;
    a housing extending about said rotary straw chopper, said housing defining an inlet into said rotary straw chopper and an outlet from said rotary straw chopper, said outlet being circumferentially spaced from said inlet, said housing including a wall portion facing said chaff discharging means and extending from said inlet to said outlet, said wall portion extending upwards and reaching vertically above a radius of action of said rotary straw chopper, whereby said inlet into said chopper is defined above said rotary straw chopper; and
    means for directing a flow of straw toward a fall-out region defined above said inlet and wherein said chaff discharging means includes means to cause the chaff to be discharged into said fall-out region to be mixed with the straw prior to reaching said inlet of said rotary straw chopper, said chaff discharging means being effective for creating a flow of air for transporting the chaff to the fall-out region at a pressure that slightly exceeds atmospheric pressure.

2. The device of claim 1, wherein said inlet extends transversely across said combine harvester.

3. The device of claim 1, wherein said rotary straw chopper is constructed as a cross-flow blower whereby the same is effective to create a negative pressure at said inlet.

4. The device of claim 3, wherein said chaff discharging means includes a wall which is disposed generally lower than said fall-out region and has a portion which extends obliquely and upwardly so as to direct the chaff to be blown into the fall-out region.

5. The device of claim 4, the chaff discharging means comprising a cleaning blower for blowing the chaff and duct means for guiding the flow of air from the cleaning blower so as to blow the chaff into the fall-out region.

6. The device of claim 5, further comprising a chaff outlet at said cleaning device and an auxiliary blower disposed proximate to said chaff outlet for assisting the discharging of the chaff.

7. The device of claim 3, wherein said chaff discharging means comprises a conveyer.

8. The device of claim 7, wherein said conveyer comprises an endless belt conveyer.

9. A device for a combine harvester, for mixing straw and chaff and for spreading the same behind the combine harvester, the device comprising:
    a cleaning device for separating chaff from grain and a chaff discharging means associated with said cleaning device for discharging chaff, said chaff discharging means comprising a cleaning blower for blowing the chaff, a chaff outlet through which the chaff discharges, and an auxiliary blower disposed at, or approximate to, said chaff outlet for assisting the discharging of the chaff;
    a rotary straw chopper having an axis of rotation which extends transversely to a longitudinal dimension associated with said combine harvester;

a housing extending about said rotary straw chopper, said housing defining an inlet into said rotary straw chopper and an outlet from said rotary straw chopper, said outlet being circumferentially spaced from said inlet, said housing including a wall portion facing said chaff discharging means and extending from said inlet to said outlet, said wall portion extending upwards and reaching vertically above a radius of action of said rotary straw chopper, whereby said inlet into said chopper is defined above said rotary straw chopper; and means for directing a flow of straw toward a fall-out region defined above said inlet and wherein said chaff discharging means includes means to cause the chaff to be discharged into said fall-out region to be mixed with the straw prior to reaching said inlet of said rotary straw chopper, said chaff discharging means being effective for creating a flow of air for transporting the chaff to the fall-out region at a pressure that slightly exceeds atmospheric pressure.

* * * * *